United States Patent
Scholtz et al.

(10) Patent No.: US 8,228,951 B2
(45) Date of Patent: Jul. 24, 2012

(54) METHOD AND SYSTEM FOR PREVENTING DATA LOSS IN A REAL-TIME COMPUTER SYSTEM

(75) Inventors: William Scholtz, Red Bank, NJ (US); Ben Chan, Holmdel, NJ (US); Ehud Langberg, Wayside, NJ (US); Shareq Rahman, Morganville, NJ (US); Xy Chen, Holmdel, NJ (US); James Zhang, Morganville, NJ (US)

(73) Assignee: Brooktree Broadband Holding, Inc., Newport Beach, CA (US)

( * ) Notice: Subject to any disclaimer, the term of this patent is extended or adjusted under 35 U.S.C. 154(b) by 643 days.

(21) Appl. No.: 12/427,698

(22) Filed: Apr. 21, 2009

(65) Prior Publication Data

US 2009/0257430 A1    Oct. 15, 2009

Related U.S. Application Data

(63) Continuation of application No. 10/430,278, filed on May 7, 2003, now Pat. No. 7,522,638.

(60) Provisional application No. 60/319,233, filed on May 7, 2002.

(51) Int. Cl.
*H04J 1/02* (2006.01)
*H04M 11/00* (2006.01)

(52) U.S. Cl. .................. 370/493; 379/93.01
(58) Field of Classification Search .......... None
See application file for complete search history.

(56) References Cited

U.S. PATENT DOCUMENTS

| | | | |
|---|---|---|---|
| 5,809,128 | A | 9/1998 | McMullin |
| 6,091,722 | A | 7/2000 | Russell et al. |
| 6,259,708 | B1 | 7/2001 | Cheng et al. |
| 6,295,357 | B1 | 9/2001 | Staples et al. |
| 6,301,339 | B1 | 10/2001 | Staples et al. |
| 6,483,903 | B1 | 11/2002 | Itay et al. |
| 6,636,506 | B1 | 10/2003 | Fan |
| 6,754,313 | B1 | 6/2004 | Quinton et al. |
| 6,965,562 | B2 | 11/2005 | Tuomi |
| 7,042,996 | B1 | 5/2006 | Mitra |
| 7,069,328 | B1 | 6/2006 | Bell |
| 2001/0010716 | A1 | 8/2001 | Smith et al. |
| 2002/0106072 | A1 | 8/2002 | Apfel |
| 2003/0035523 | A1 | 2/2003 | Mansfield |
| 2003/0043787 | A1 | 3/2003 | Emerson, III |
| 2003/0086559 | A1 | 5/2003 | Chen et al. |
| 2004/0146072 | A1 | 7/2004 | Farmwald |
| 2004/0202310 | A1 | 10/2004 | Li |
| 2005/0117730 | A1 | 6/2005 | Mullis et al. |
| 2005/0152345 | A1 | 7/2005 | Bog et al. |
| 2006/0268836 | A1 | 11/2006 | Prentice |

FOREIGN PATENT DOCUMENTS

EP    1059796 A2    12/2000
WO    0186914 A2    11/2001

*Primary Examiner* — Clemence Han
(74) *Attorney, Agent, or Firm* — Haw-minn Lu

(57) ABSTRACT

A method and system are provided for preventing data loss in a VoIP system. In particular, during a VoIP call, it is determined whether incoming ringing on a POTS line causes an unacceptable level of signal loss or errors. If so, for subsequent VoIP calls, the CO handling calls to the POTS line is instructed to either answer each call with a busy signal or automatically forward calls to the POTS line to the VoIP line or other selected telephone. Calling returns to normal upon ending of the VoIP call. In this manner, incoming ringing on the POTS line does not result in call dropping or lengthy retraining processes.

20 Claims, 4 Drawing Sheets

METHOD AND SYSTEM FOR PREVENTING DATA LOSS IN A REAL-TIME COMPUTER SYSTEM

RELATED APPLICATIONS

The present invention is a continuation of U.S. application Ser. No. 10/430,278, filed May 7, 2003, now U.S. Pat. No. 7,522,638, which claims priority to U.S. provisional application Ser. No. 60/319,233, filed Jul. 5, 2002, both of which are incorporated herein by reference in their entirety.

BACKGROUND OF THE INVENTION

The present invention relates generally to voice communication systems and, more particularly, to systems for transmitting and receiving voice information over packet-switched networks.

For years, the telecommunications industry has examined was to combine the flexibility and functionality of packet-switched networks primarily used for transmitting data (e.g., the Internet) with the accuracy and speed of conventional circuit based telephone networks (i.e., the Public Switched Telephone Network or PSTN). Conventional telephone systems differ from modern data-based computer networks in several ways. Most importantly however, are the differences in how connections between the sender and the recipient are made.

In conventional telephone systems, when a caller picks up his telephone, an OFFHOOK message is sent from the phone across the PSTN to the user's central office (CO). In response, the CO sends a dialtone back to the user's phone indicated that he is connected and can initiate a call. Next, the caller dials the phone number of the intended recipient and, through the keypad tones or pulses, this information is transmitted to the CO. In response, the CO transmits a RINGING message causing the recipient's phone to ring. If the recipient picks up the phone, the recipient's phone sends an OFFHOOK message to the CO and a dedicated circuit across the PSTN between the caller and the recipient is established, enabling voice traffic to pass between the connected parties in a smooth, seamless manner. Typically, the voice traffic is digitized at the CO and transmitted over the dedicated PSTN circuit using a technology called time division multiplexing (TDM). This dedicated circuit continuously transmits information between the parties at a rate of about 128 kilobits per second (kbps) (64 kbps each way) for the duration of the call. For a five minute telephone call, this equates to the transmission of approximately 4.7 megabytes (MB) of information.

Unfortunately, in most telephone conversations, much of the bandwidth required to enable the transmission of information between the parties is wasted. For example, because people typically do not speak while the other party is speaking, almost half of the available bandwidth is wasted during the call. Similarly, during periods of silence (even milliseconds at a time), no information needs to pass between the parties. However, because of the dedicated, physical circuit between the parties, information is passed regardless of content.

Contrary to conventional telephone systems, most data networks such as the Internet, do not transmit information across dedicated, physical circuits. Rather, information sent between two computers on a network is broken up in a series of small packets. These packets are then routed to the destination and reassembled at the recipient end. Various protocols have been developed for enabling the efficient and accurate transfer of information across computer networks, such as internet protocol (IP), asynchronous transfer mode (ATM), Ethernet, etc. Because computer networks only transmit the information which needs to be relayed, there is little wasted bandwidth.

Because of the rising need for network bandwidth and the continued need to optimize bandwidth which is already available, efforts have been made to reduce the bandwidth cost of voice traffic by routing voice traffic over packet-switched networks. This concept is generally referred to as voice over packet telephony (e.g., VoIP), although various other transmission methods and network protocols may also be employed, such as DSL, ATM, or the like. In general, the concept of VoIP requires a seamless experience on the part of the user. That is, conventional telephone systems (referred to as plain old telephone systems or POTS) must be able to utilize the technology in an invisible manner. In practice, similar to conventional PSTN devices, when a POTS device (or analogous customer premises equipment (CPE) device) goes off hook, a message is sent to a CO indicating this state. A dialed number is then received by the CO, indicating the recipient's address, and the corresponding voice traffic is digitized and packetized at the CO for transmission to the recipient's CPE device.

To assist in enabling the effective use of VoIP technology, many CPE devices include support for simultaneous operation of both VoIP and POTS systems. In such a system, a splitter device located at the CO operates to separate received and transmitted signals from the CPE. Upon receipt of an incoming POTS call, signals are first passed through a surge suppressor device which operates to clip the ringing signals. Unfortunately, during ringing on the POTS line, the distortion generated by the surge suppressor is often larger than a transmitted data signal, resulting in a loss of data transmission if a VoIP call is underway during the ringing. Following this disruption in service, it is often necessary to retrain the CPE VoIP system. This process is time consuming (i.e., ~11 secs.) and results in disruption of the outgoing call.

Accordingly, it is desired to provide a method and system for preventing the disruption of VoIP calls caused by concurrent ringing on a POTS line.

BRIEF SUMMARY OF THE INVENTION

The present invention overcomes the problems noted above, and provides additional advantages, by providing a method and system for preventing data loss in a VoIP system. In particular, during a VoIP call, it is determined whether incoming ringing on a POTS line causes an unacceptable level of signal loss or errors. If so, for subsequent VoIP calls, the CO handling calls to the POTS line is instructed to automatically forward calls to the POTS line to the VoIP line. Calling returns to normal upon ending of the VoIP call. In this manner, incoming ringing on the POTS line does not result in call dropping or lengthy retraining processes.

BRIEF DESCRIPTION OF THE DRAWINGS

The present invention can be understood more completely by reading the following Detailed Description of the Preferred Embodiments, in conjunction with the accompanying drawings.

DETAILED DESCRIPTION OF THE PREFERRED EMBODIMENTS

Figure 1:
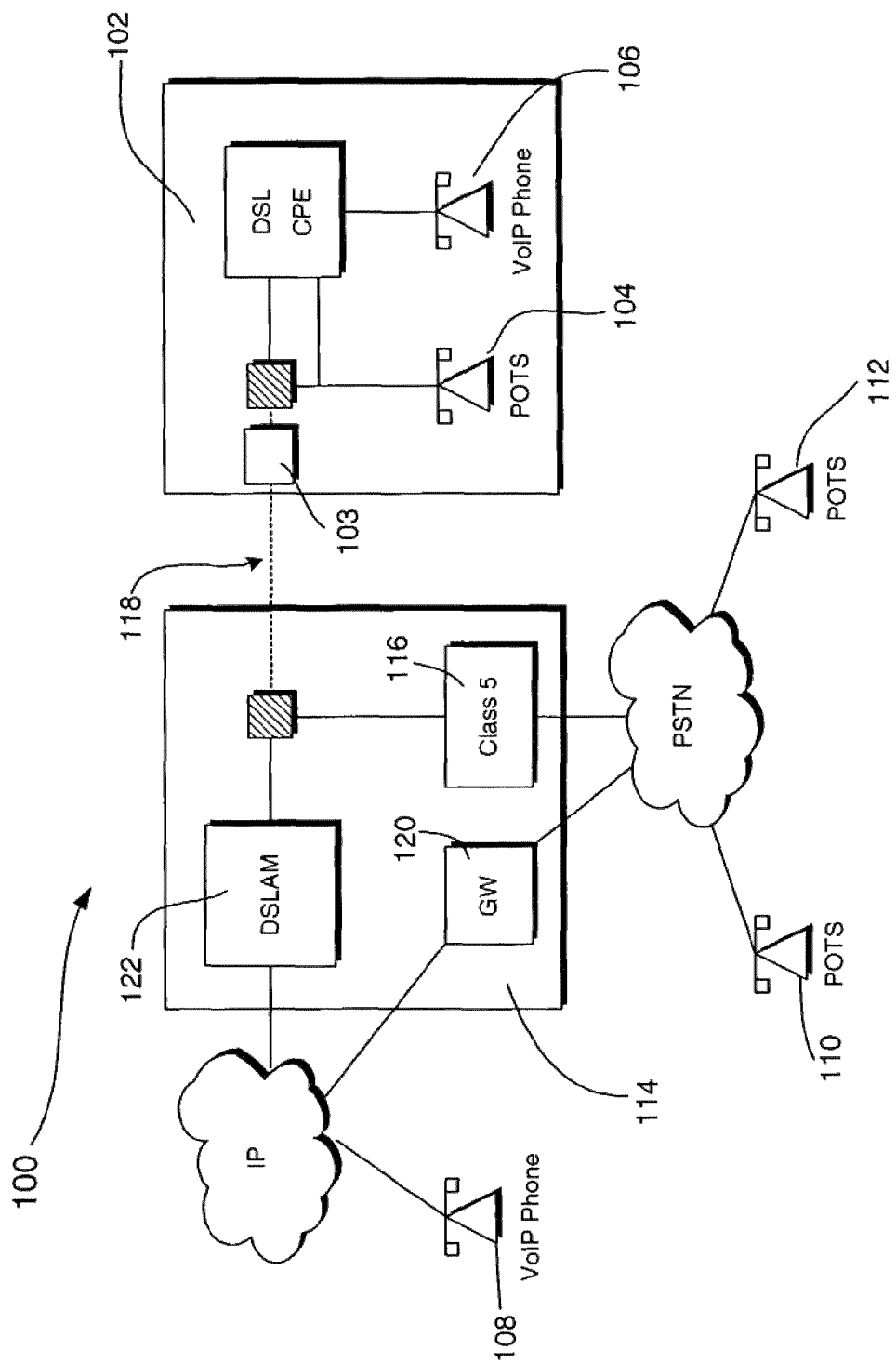
FIG. 1 is a block diagram illustrating a telephony system of the present invention.

Referring generally to figures and, in particular, to FIG. 1, there is shown a block diagram 100 illustrating a telephony system of the present invention. In particular, diagram 100 includes a first CPE system 102 including surge suppressor 103, a POTS phone 104, and a VoIP phone 106. It should be understood that the CPE systems described herein may be or include any of the following: a telephone, a fax machine, a modem (e.g., digital subscriber line (DSL), coaxial cable, phone), private branch exchange (PBX), or any other integrated access device (IAD) for performing conventional voice system functions or packetization of voice traffic. Likewise, VoIP phone 106 may be any system capable of running real-time packet-based applications and is not limited to either voice applications or the IP protocol. Further, CPE 102 may also include various configurations for splitting DSL and POTS signals, such as modems which include signal splitters, stand alone signal splitters, and data filters for isolating POTS traffic to POTS CPE devices. System 100 also includes a plurality of additional CPE devices 108, 110, and 112 connected over either the PSTN or an IP network.

In operation, each CPE device or system communicates with each other through a central office (CO) system 114, typically operated by an incumbent local exchange carrier (ILEC) and/or a competitive local exchange carrier (CLEC). For conventional analog voice traffic, transmissions pass through a class 5 switch 116 associated with the CO 116 and along to the POTS phone of CPE 102 via a PSTN/VoIP network 118 and through the surge suppressor 103. For DSL or VoIP traffic, voice transmissions pass through a voice gateway (GW) 120 to a DSL access multiplexer (DSLAM) 122 and along to the VoIP phone 106 at CPE 102 via network 118 and also through the surge suppressor. For simplicity, the remainder of this description relates specifically to a system wherein outgoing calls are placed over the VoIP phone 106, while incoming calls are handled by the POTS phone 104, although it should be understood that the present invention may be implemented in any system wherein POTS and VoIP lines are used concurrently.

Because of deficiencies in the design, manufacture and/or operation of surge suppressor 103, the system described above often suffers from non-recoverable data loss on the VoIP line during an incoming call on the POTS phone 104. Essentially, during ringing of the POTS phone 104, a distortion is created in the surge suppressor 103 which is larger in magnitude than the VoIP data being simultaneously transmitted. Consequently, no data is permitted to pass through the surge suppressor 103, resulting in delay and potential timing out of the VoIP session. Once the ringing stops, the VoIP CPE 106 must perform a retraining with the CO to establish another VoIP session. This retraining period may take as long as 10-15 seconds, an obviously unacceptable delay when dealing with voice traffic.

Figure 2:
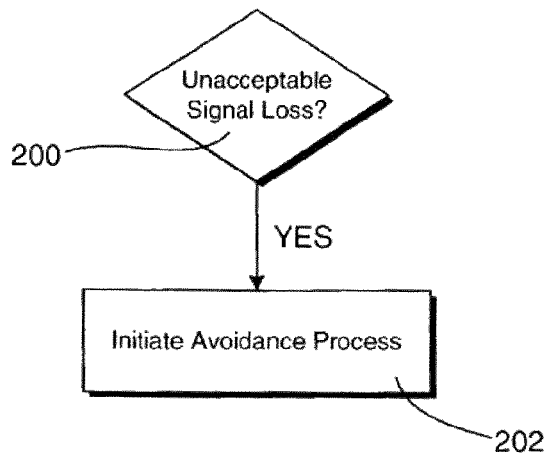
FIG. 2 is a flow diagram illustrating one embodiment of a method for preventing data loss of VoIP transmissions.

Referring now to FIG. 2, there is shown a flow diagram illustrating one embodiment of a method for preventing data loss of VoIP transmissions in accordance with the present invention. In step 200, the CPE device determines whether an unacceptable degree of signal or data loss is suffered when a RINGING signal is received on the POTS line during a VoIP transmission. In step 202, if it is determined that an unacceptable degree of signal loss occurs in such circumstances, the CPE device initiates a process for avoiding the loss preventing the POTS phone from ringing and thereby eliminating the cause of the loss. Additional details of this process will be set forth below.

Figure 3:
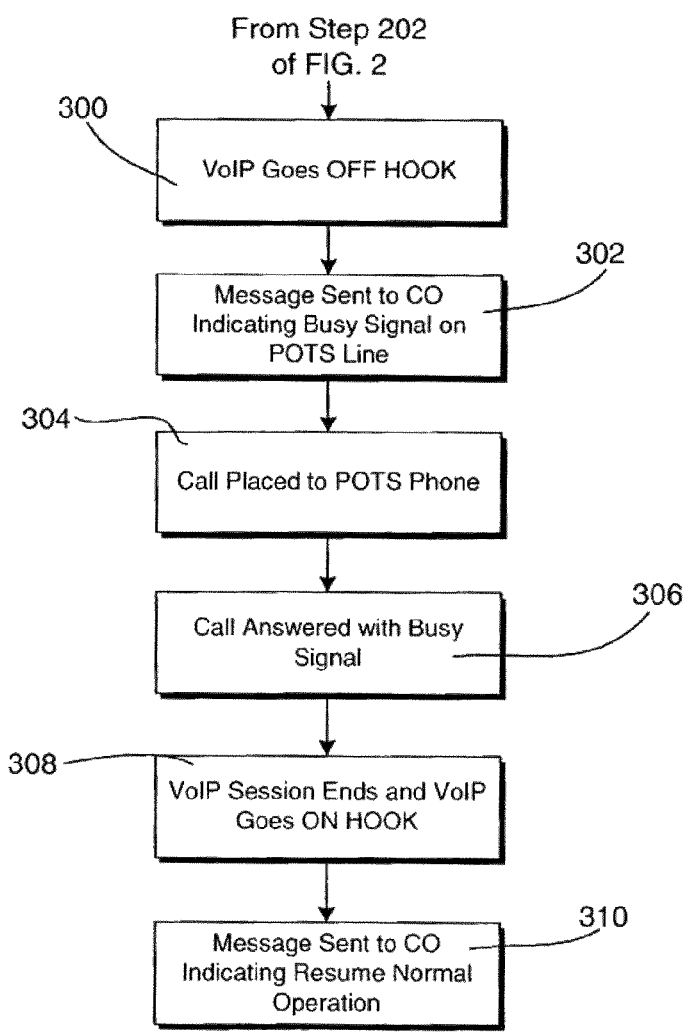
FIG. 3 is a flow diagram illustrating one embodiment of a method for preventing system loss during VoIP transmissions following a determination of unacceptable signal loss.

Turning now to FIG. 3, there is shown a flow diagram illustrating one embodiment of a method for preventing signal loss during VoIP transmissions following determination of unacceptable signal loss in step 202, above. Initially, in step 300, a VoIP call is placed, resulting in the VoIP phone going OFF HOOK. In step 302, a message is sent to the CO which handles calls for the CPE indicating that all calls to the POTS phone should be answered with a busy signal. In step 304 a call is placed to the POTS phone. In step 306, the call is answered with a busy signal by the CO. In step 308, the VoIP session ends and the VoIP goes ON HOOK. In step 310, a message is sent to the CO indicating that operation should return to normal for the POTS phone. In this manner, calls for the POTS phone placed during a VoIP call will not reach the POTS phone and result in a disabling RINGING signal being received.

Figure 4:
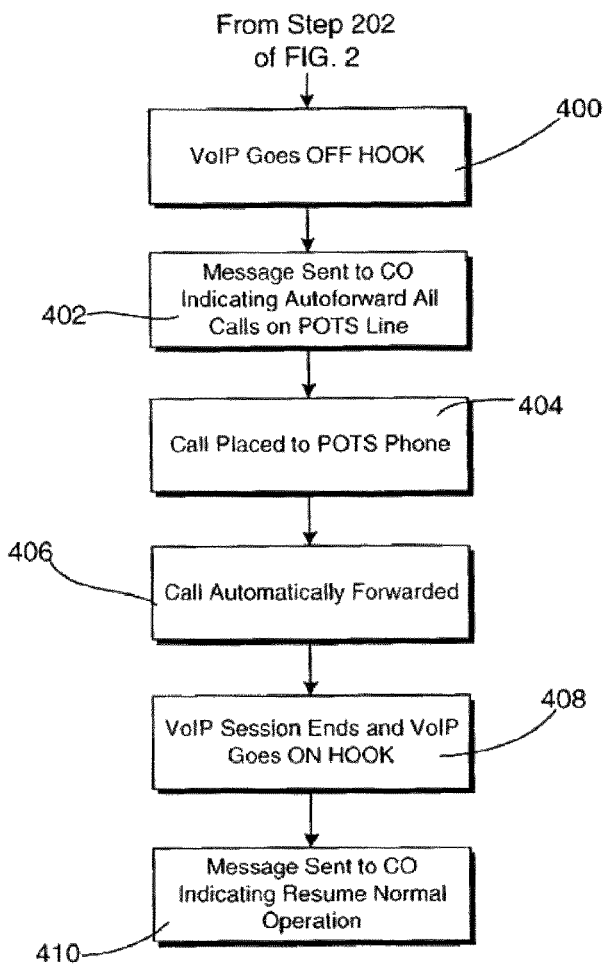
FIG. 4 is a flow diagram illustrating another embodiment of a method for preventing system loss during VoIP transmissions following a determination of unacceptable signal loss.

Turning now to FIG. 4, there is shown a flow diagram illustrating another embodiment of a method for preventing signal loss during VoIP transmissions following determination of unacceptable signal loss in step 202, above. Initially, in step 400, a VoIP call is placed, resulting in the VoIP phone going OFF HOOK. In step 402, a message is sent to the CO indicating that all calls to the POTS phone should be forwarded to the VoIP phone via the CO's GW and DSLAM.

Figure 5:
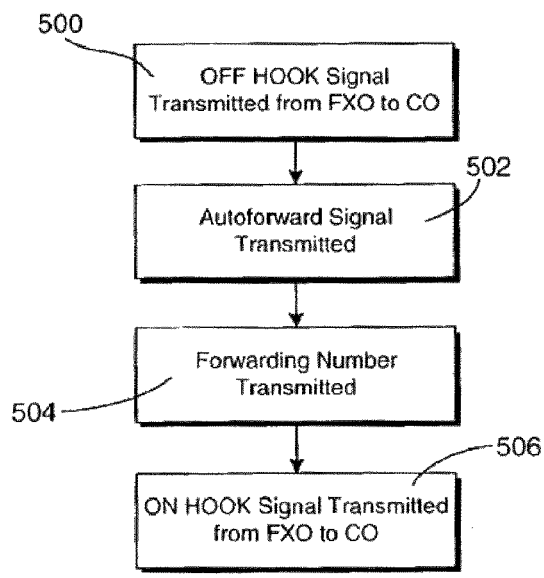
FIG. 5 is a flow diagram illustrating one preferred embodiment of step 402 of FIG. 4.

Referring to FIG. 5, there is shown a flow diagram illustrating one preferred embodiment of step 402 above. In particular, in this embodiment, the messages sent to the CO include instructions to the CO's class 5 switch including a combination of a Foreign Exchange Office (FXO) interface and DTMF (Dual Tone MultiFrequency) signals. In step 500, a signal is transmitted from the CPE's FXO indicating to the class 5 switch that the FXO is OFF HOOK. Next, in step 502, the CPE sends a DTMF signal indicating that the switch should prepare to autoforward calls to the subsequent telephone number. In North America, this signal is *72, however, any suitable signal may be used depending upon the locality in which the system resides. In step 504, the CPE transmits DTMF signals representing the telephone number to forward POTS call to, such as the VoIP phone, although any other telephone number may be used such as the user's mobile telephone. Following entry of the forwarding number, the CPE may wait for a acknowledgment tone if available. In step 506, a signal is transmitted which indicates to the class 5 switch that the FXO is once again ON HOOK.

Returning to FIG. 4, in step 404 a call is placed to the POTS phone. In step 406, the call is automatically forwarded to the VoIP phone by the CO. In step 408, the VoIP session ends and the VoIP goes ON HOOK. In step 410, a message is sent to the CO indicating that operation should return to normal for the POTS phone.

Figure 6:
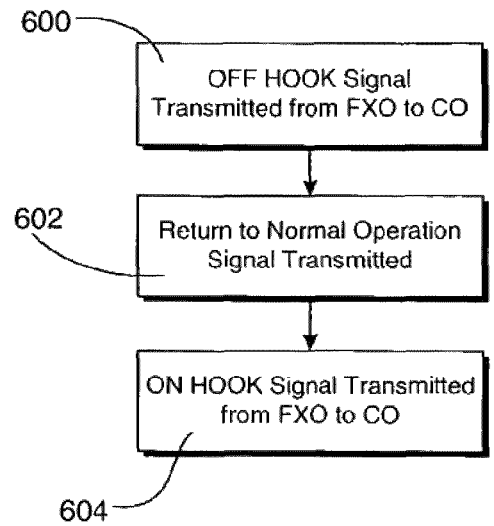
FIG. 6 is a flow diagram illustrating one preferred embodiment of step 410 of FIG. 4.

Referring to FIG. 6, there is shown a flow diagram illustrating one embodiment of step 410 above. In step

600, a signal is transmitted which indicates to the class 5 switch that the FXO is OFF HOOK. Next, in step 602, the CPE sends a DTMF signal indicating that the switch should return to normal operation. Again, in North America, this signal is *73. In step 604, a signal is transmitted which indicates to the class 5 switch that the FXO is ON HOOK. From this point on, normal ringing resumes for the POTS phone.

In this manner, calls for the POTS phone placed during a VoIP call will not reach the POTS phone and result in a disabling RINGING signal being received. However, by limiting the POTS restrictions to incoming calls only, outgoing calls on the POTS phone are not affected. Further, by forwarding calls automatically to the VoIP phone, any emergency inbound call to the POTS phone is automatically picked up by VoIP phone. Further, the present invention enables low cost VoIP call forwarding which is local to CO's class 5 switch regardless the physical location of VoIP Phone.

Figure 7:
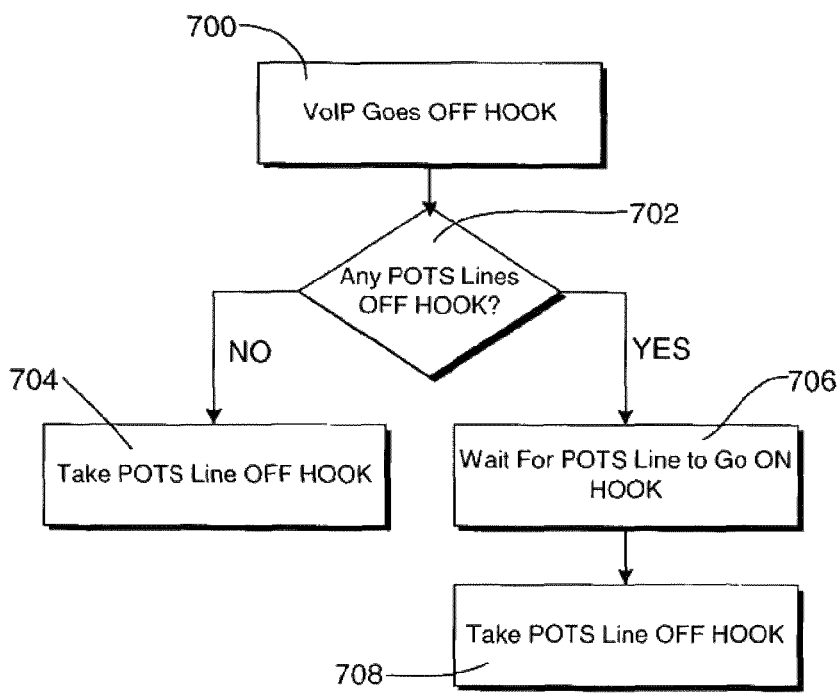
FIG. 7 is a flow diagram illustrating an additional embodiment of a method for preventing data loss during VoIP transmissions.

Turning now to FIG. 7, there is shown a flow diagram illustrating an additional embodiment of the present invention. Initially, in step 700, a VoIP call is placed, resulting in the VoIP phone going OFF HOOK. In step 702, the CPE device determines whether any POTS phone connected to the POTS line is OFF HOOK (i.e., one of the POTS phones is currently in use), if not, the CPE takes the POTS line OFF HOOK in step 704, resulting in a busy signal to all incoming calls. If any POTS phone is determined to be OFF HOOK in step 702, the CPE waits until all POTS phones are ON HOOK in step 706 and, in step 708, takes the POTS line OFF HOOK, again resulting in a busy signal to all incoming calls. In a preferred embodiment, this functionality is controllable by the user, thereby enabling emergency calls to the POTS line during VoIP calls.

In an additional embodiment of the present invention, the CPE is configured to not attempt retraining until after the RINGING ends. Since, data transmission is prevented during ringing on the POTS line, system retaining is likewise not possible. By waiting until the ringing stops, the CPE may be able to bypass retraining and go right to data transmission.

In yet another embodiment of the present invention, the CPE is configure to stop notifying the CO about errors it may receive during ringing on the POTS line. If the CPE informs the CO modem about errors and the CO modem is not suffering from errors itself, the CO may request a retrain, thus potentially introducing additional delay. In DMT the CPE uses indicator bits to tell the CO when it is getting errors (CRC, SEF, etc.). Other modems may use similar techniques.

Another manner of preventing data loss during ringing on a POTS line involves configuring the CPE to disable bit swapping between DMT bins. In conventional operation, DMT systems include a plurality of bins corresponding to frequency ranges. When certain bins are determined to be bad by the CPE, it may opt to switch bins to a different frequency range. If this is necessary, the CPE informs the CO that is wishes to swap bins and waits for a ACK signal from the CO acknowledging the switch. Unfortunately, if data is being dropped by a ringing on the POTS line, this ACK signal may not be received, even though it was sent by the CO. Since the CO switches and the CPE does not, the two become out of sync resulting in the need to retrain. By eliminating bit swapping, this source of error can be minimized.

While the foregoing description includes many details and specificities, it is to be understood that these have been included for purposes of explanation only, and are not to be interpreted as limitations of the present invention. Many modifications to the embodiments described above can be made without departing from the spirit and scope of the invention, as is intended to be encompassed by the following claims and their legal equivalents.

What is claimed is:

1. A method for preventing data loss in a voice over internet protocol (VoIP) system at a CPE, comprising the steps of:
    determining, during an outgoing call on a VoIP line, whether a level of signal loss or error caused by incoming ringing on a POTS line associated with the VoIP line exceeds a predetermined threshold; and
    in response to determining that the level of signal loss is unacceptable, suppressing any attempt by the CPE to induce a retrain until the incoming ringing stops.

2. The method of claim 1, wherein the suppressing comprises:
    suppressing error transmissions by the CPE to the CO until the ringing stops.

3. The method of claim 1, wherein the suppressing comprises:
    disabling bit swapping between DMT bins during the incoming ringing.

4. The method of claim 1, further comprising:
    in response to determining that the level of signal loss is unacceptable, initiating a signal loss prevention process to prevent subsequent incoming ringing on the POTS line during VoIP calls.

5. The method of claim 4, further comprising: automatically forwarding subsequent calls placed to the POTS line to a selected telephone.

6. The method of claim 5, wherein the selected telephone is a VoIP phone on the VoIP line.

7. The method of claim 4, further comprising:
    notifying a central office (CO) associated with the VoIP line and the POTS line to respond to subsequent calls placed to the POTS line with a busy signal during outgoing calls on the VoIP line.

8. A system for preventing data loss during voice over internet protocol (VoIP) transmissions, comprising:
    at least one customer premises equipment (CPE) system for receiving and placing VoIP and plain old telephone system (POTS) calls, the at least one CPE system including a surge suppressor for preventing signal spikes from damaging the at least one CPE system; and
    a central office (CO) associated with the at least one CPE system for receiving and forwarding VoIP and POTS calls on IP or PSTN networks,
    wherein the at least one CPE system includes means for determining, during an outgoing call on a VoIP line, whether a level of signal loss or error caused by incoming ringing on a POTS line associated with the VoIP line exceeds a predetermined threshold; and
    wherein the at least one CPE system includes means for suppressing any attempt by the CPE to induce a retrain until the incoming ringing stops.

9. The system of claim 8, wherein means for suppressing any attempt to retrain comprises:
    means for suppressing error transmissions by the CPE to the CO until the ringing stops.

10. The system of claim 9, wherein the suppressing comprises:
    means for disabling bit swapping between DMT bins during the incoming ringing.

11. The system of claim 8, where in the at least one CPE system further includes means for initiating a signal loss prevention process to prevent subsequent incoming ringing on the POTS line during VoIP calls.

12. The system of claim 8, further comprising means for automatically forwarding subsequent calls placed to the POTS line to a selected telephone.

13. The system of claim 12, wherein the selected telephone is a VoIP phone on the VoIP line.

14. The system of claim 8, further comprising means for notifying the CO to respond to subsequent calls placed to the POTS line with a busy signal during outgoing calls on the VoIP line.

15. A system for preventing data loss in a voice over internet protocol (VoIP) system, comprising:
    means for determining, during an outgoing call on a VoIP line, whether a level of signal loss or error caused by incoming ringing on a plain old telephone system (POTS) line associated with the VoIP line is unacceptable based on a threshold; and
    means for suppressing any attempt by the CPE to induce a retrain until the incoming ringing stops in response to determining that the level of signal loss is unacceptable.

16. The system of claim 15, wherein means for suppressing any attempt to retrain comprises:
    means for suppressing error transmissions by the CPE to the CO until the ringing stops.

17. The system of claim 15, wherein the suppressing comprises:
    means for disabling bit swapping between DMT bins during the incoming ringing.

18. The system of claim 15, further comprising:
    means for preventing subsequent incoming ringing on the POTS line during VoIP transmissions in response to determining that the level of signal loss is unacceptable.

19. The system of claim 15, further comprising means for automatically routing subsequent calls placed to the POTS line to a selected telephone.

20. The system of claim 15, further comprising means for notifying a central office (CO) associated with the VoIP line and the POTS line to respond to subsequent calls placed to the POTS line with a busy signal during outgoing calls on the VoIP line.

\* \* \* \* \*

UNITED STATES PATENT AND TRADEMARK OFFICE
CERTIFICATE OF CORRECTION

| | | |
|---|---|---|
| PATENT NO. | : 8,228,951 B2 | Page 1 of 1 |
| APPLICATION NO. | : 12/427698 | |
| DATED | : July 24, 2012 | |
| INVENTOR(S) | : William Scholtz et al. | |

It is certified that error appears in the above-identified patent and that said Letters Patent is hereby corrected as shown below:

In The Claims:

Column 6, line 60, (in claim 10, line 1) replace "claim 9" with "claim 8"

Signed and Sealed this
Eighteenth Day of September, 2012

David J. Kappos
*Director of the United States Patent and Trademark Office*